United States Patent [19]
Yokote et al.

[11] 3,973,249
[45] Aug. 3, 1976

[54] APPARATUS FOR DETECTING LEAKAGE FROM CONTAINER AND METHOD THEREFOR

[75] Inventors: Takamasa Yokote, Kashihara; Yoshitaka Kinouchi, Yao, both of Japan

[73] Assignee: Toyo Aluminium K. K., Osaka, Japan

[22] Filed: Feb. 20, 1975

[21] Appl. No.: 551,344

[30] Foreign Application Priority Data
Feb. 22, 1974 Japan.............................. 49-21807
Dec. 28, 1974 Japan.............................. 50-3325
Dec. 28, 1974 Japan.............................. 50-3326

[52] U.S. Cl................................. 340/242; 73/49.3
[51] Int. Cl.² ........................................ G08B 21/00
[58] Field of Search ............... 340/235, 242; 73/40, 73/40.7, 49.3, 52

[56] References Cited
UNITED STATES PATENTS

| | | | |
|---|---|---|---|
| 3,487,677 | 1/1970 | Molitor.............................. | 73/40.7 |
| 3,591,944 | 7/1971 | Wilcox............................ | 73/49.3 X |
| 3,744,210 | 7/1973 | O'Lenick et al................. | 73/40.7 X |

Primary Examiner—John W. Caldwell
Assistant Examiner—Daniel Myer
Attorney, Agent, or Firm—Stewart and Kolasch, Ltd.

[57] ABSTRACT

An apparatus for detecting leakage of water molecules through a defective portion, if any, of a container which comprises a vessel having a flange at the periphery thereof and a lid heat sealed to said flange and is filled with water-contained materials, such as foodstuffs, thereby detecting said defective portion, said apparatus comprising a chamber for receiving said container such that an enclosed space is formed along and in the vicinity of said sealed flange portion, partitions provided on said chamber for partitioning said enclosed space into a plurality of enclosed space cells, a plurality of humidity sensitive devices each provided individually associated with said enclosed space cells, a vacuum tank connected to said enclosed space cells for exhausting the air therefrom, a vacuum pump connected to said vacuum tank, and an electric circuit connected to said humidity sensitive devices for threshold detecting the outputs therefrom. Division of said enclosed space into a plurality of cells and humidity detection in the respective cells enhances accuracy of the abovementioned detection.

26 Claims, 14 Drawing Figures

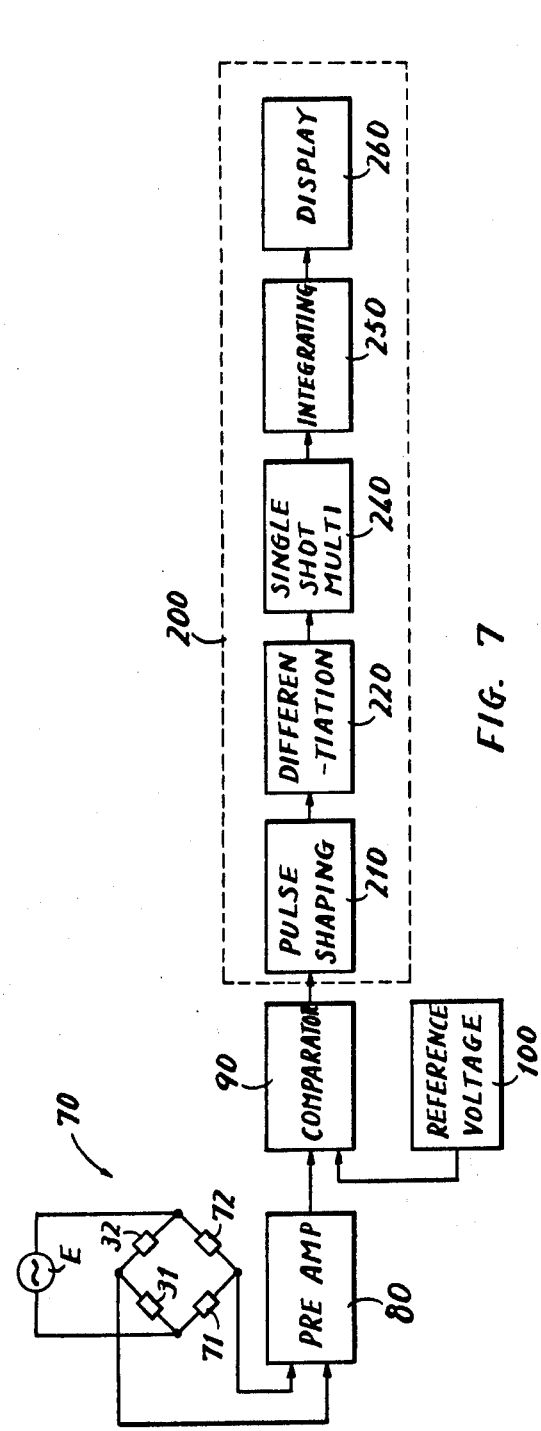
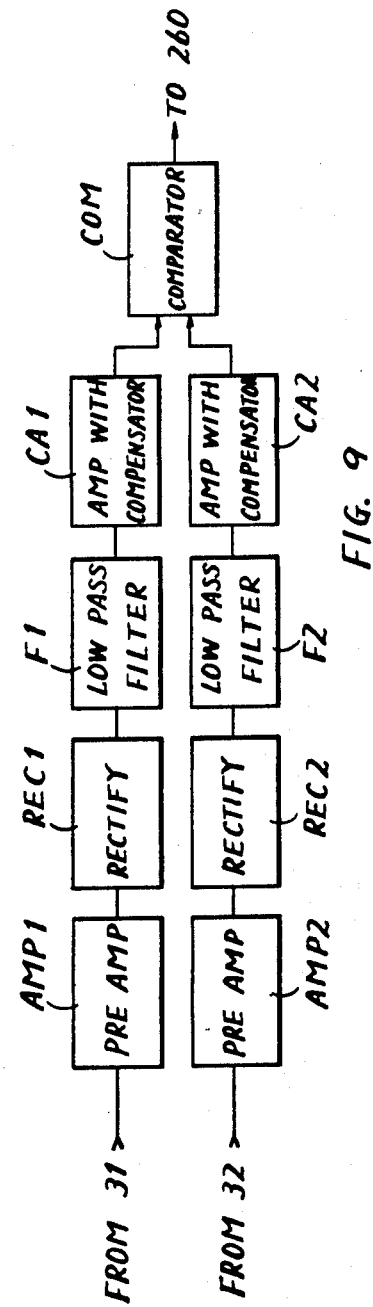
FIG. 7
FIG. 9

APPARATUS FOR DETECTING LEAKAGE FROM CONTAINER AND METHOD THEREFOR

BACKGROUND OF THE INVENTION

1. Field of the Invention

The present invention relates to an apparatus for and a method of detecting any leakage of a hermetically sealed container, and more particularly to an apparatus for and a method of detecting a defective portion such as a pin hole and the like, if any, in the sealed portion of the hermetically sealed container which is filled with water-contained materials.

2. Description of the Prior Art

Recently hermetically sealed containers have been often used for foodstuffs and the like from a sanitation point of view or from a preserving point of view. Such a hermetically sealed container is typically formed as follows. The food is stuffed into a vessel having a flange at a periphery thereof, the vessel is then covered from above with an aluminum foil of 0.06 to 0.07 mm in thickness, and the peripheral flange portion which the vessel and the cover of the aluminum foil contact each other is heat sealed to establish a completely hermetically sealed condition. Conventionally, various inspecting methods have been adopted to examine whether or not the completely hermetically sealed condition was established. For example, a hermetically sealed container was submerged in water under a reduced pressure condition. When a pin hole existed on the container, the air in the container was released into the water and appeared as air bubbles, so that they were visually observed. However, this method is not applicable to all type of the things. As the case may be, there are some type of things which can not be submerged into the water. Adoption of the vacuum pressure of 20 Torr or less to produce the pressure reduced condition also presents a problem that it becomes difficult to discriminate the above mentioned air bubbles from those caused by the boiling of the water, with the result that the exact examination thereof can not be accomplished. According to another inspecting method, a body to be examined is put into an airtight enclosure and the pressure therein is increased or reduced, so that a change in air pressure inside the airtight enclosure is caused, when the pressure difference is detected through comparison of the changes in air pressure with those in case of a reference sample. This method can not be used for flexible containers, which change in volume.

Therefore, it is a primary object of the present invention to provide a detecting apparatus and a method which is capable of correctly and quickly detecting any defective portion of the container which is filled with water-contained materials and sealed hermetically, and if desired, the locations of the defects thereof.

It is another object of the present invention to measure water leakage from only a defective portion by eliminating the effects of water which exists in the atmosphere or on the surface of the body to be examined and is not related to the defects.

Other objects and features of the present invention will be more apparent from the following detailed description with reference to the accompanying drawings.

SUMMARY OF THE INVENTION

The present invention electrically detects, by the use of humidity sensitive devices, water leakage through a defective portion of a container, rigid or flexible, which is filled with water-contained materials and sealed hermetically, such that measurement is made of water leakage only through a defective portion of the container, by eliminating the effects of the water which exists in the atmosphere or on the surface of the container. Some type of the container has a peripheral portion formed in a flange-shape by hermetically sealing, typically heat sealing, the flange portion of a main body and a lid constituting the container. In order to accurately measure the water leakage and thus detect any defective portion in the sealed portion of the container, a measuring chamber is structured such that an enclosed space may be formed along and in the vicinity of the flange portion of the container with the container being received in the measuring chamber.

According to an aspect of the present invention, the measuring chamber is provided with partitioning means for dividing the enclosed space into a plurality of separate chamber cells. A plurality of humidity sensitive devices are each mounted correspoindingly to the plurality of respective separate chamber cells.

Difference in pressure is adapted to be caused between in the hermetically sealed container and in the measuring chamber. Therefore, if any defective portion exists in the container, such as in the hermetically sealed portion, leakage of water is caused remarkably due to the pressure difference. As a result, the humidity sensitive device in the corresponding chamber cell responds to the change in humidity to provide an electrical signal, which is withdrawn and threshold detected to display the water leakage and thus the defective portion of the container.

BRIEF DESCRIPTION OF THE DRAWINGS

FIG. 7 shows a detailed block diagram of an electric connection of the FIG. 1 block diagram, FIG. 9 is a block diagram of another embodiment of a circuit for detecting a defecting portion of the container.

Figure 1:
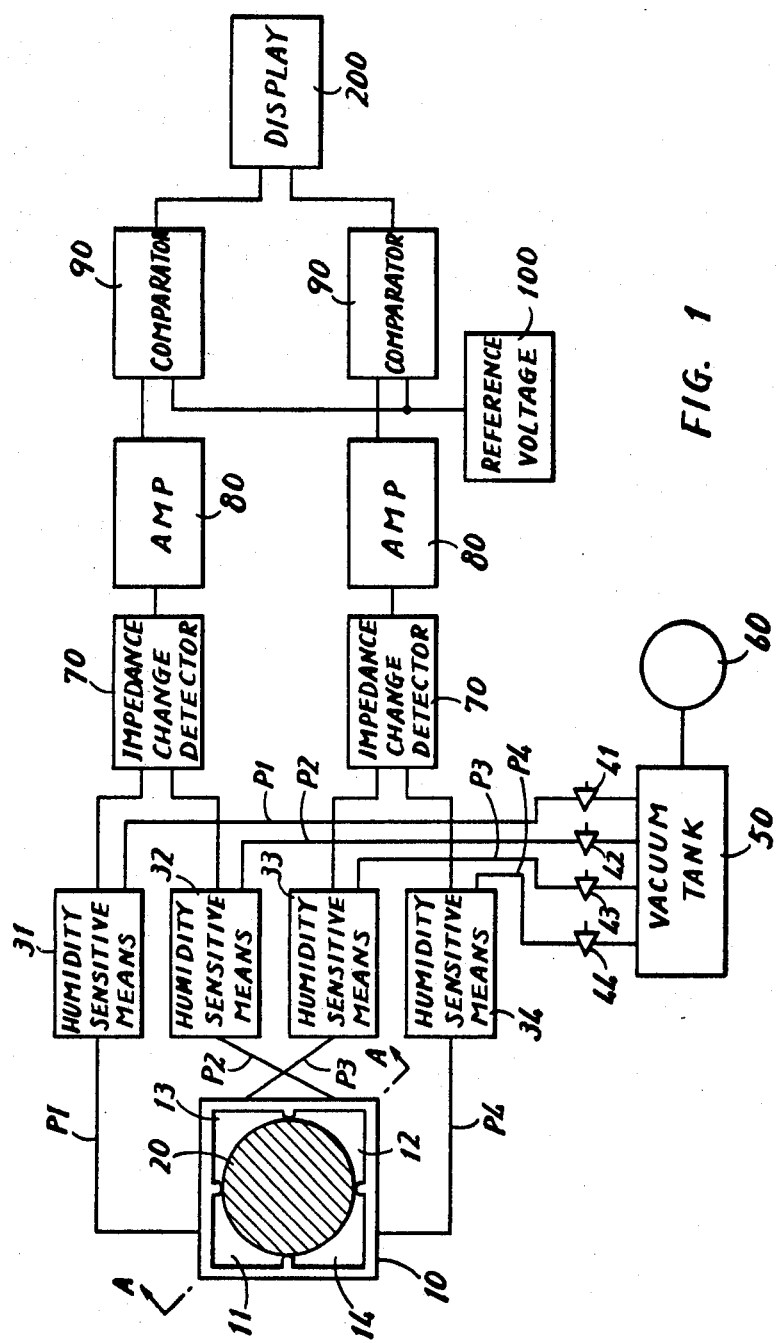
FIG. 1 shows a block diagram of one embodiment of the present invention.
Figure 2:
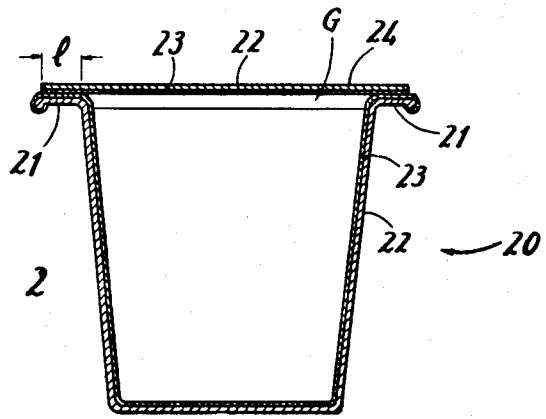
FIG. 2 is a cross-sectional view of one example of a container to be examined in accordance with the present invention.

DESCRIPTION OF THE PREFERRED EMBODIMENT:

FIG. 1 is a schematic block diagram showing one embodiment of the present invention. A container 20 which is filled with water-contained materials and sealed hermetically is disposed in a measuring chamber 10 so as to provide an enclosed space therebetween. An example of this container 20 is shown in section in FIG. 2. The container 20 comprises a vessel formed in a cup shape and is provided with a flange portion 21. The container 20 comprises a composite sheet of an aluminum foil 22 of 80 $\mu$ to 100 $\mu$ in thickness and a synthetic resin film 23 of 50 $\mu$ in thickness. The sythetic resin film is of polypropylene, polyvinyl chloride, or the like. A lid member 24 which similarly conprises a composite structure of the aluminum foil 22 and the synthetic resin film 23 is heat sealed onto the container 20. The heat sealed portion comprises the flange portion 21 of the container 20, and the width $l$ of the heat sealed portion is preferably of 2.5 mm or more. The container formed as described hereinabove is greater in strength, smaller in gas and moisture permeability, and superior in the flavor preservation of the hermetically sealed food.

Total humidity C inside the abovementioned enclosed space in the measuring chamber 10 is as follows.

$$C = C1 + C2 + C3 + C4$$

wherein C1 is humidity caused by leakage through a pin hole on the container 20, C2 being humidity caused by water attached to the outer surface of the container, C3 being humidity of atmosphere in the measuring chamber 10, and C4 being humidity caused by water of the inner wall of the measuring chamber 10.

Assume that the abovementioned enclosed space of the measuring chamber 10 is equally divided into, for example, the number ($n$) and a pin hole exists in one of the number ($n$) of separate chamber cells, then the total humidity Cn of the corresponding chamber cell is $$Cn = C1 + C2/n + C3/n + C4/n \qquad 1.$$

The total humidity Cn' of one separate chamber cell wherein no such a pin hole does exist is $$Cn' = C2/n + C3/n + C4/n \qquad 2.$$

Thus, it is understood that the inherently existing error factors C2, C3 and C4 can be neglected as the abovementioned enclosed space of the measuring chamber 10 is divided into a plurality of chamber cells. The present invention employs this principle. Therefore, in the embodiment shown, the abovementioned enclosed space of the measuring chamber 10 is divided equally so as to form four separate chamber cells, as to be described subsequently. Upon installation of the container 20 in the measuring chamber 10, each separate chamber cell 11 to 14 becomes independent with respect to each other. The separate chamber cells independently examine the sealing condition of their corresponding portions of the container, respectively. Each of the chamber cells 11 to 14 is connected to a vacuum pump 60 through pipes P1 to P4 and commonly to a vacuum tank 50. Flow adjusting valves 41 to 44 are mounted in the pipes P1 to P4, respectively, to adjust the flow amount properly. Each of the chamber cells 11 to 14 of the enclosed space of the measuring chamber 10 is made vacuum or reduced in pressure through the pipes P1 to P4, respectively. Namely, the air pressure in the measuring chamber 10 is reduced to be lower than that in container 20. Accordingly, if any defect such as a pin hole or the like exists, the gas or liquid inside the container 20 leaks into the measuring chamber by the difference in pressure.

According to an aspect of the present invention, humidity sensitive devices 31 to 34 are mounted to be sensitive to the humidity in the pipes P1 to P4, respectively, so that the devices 31 to 34 are sensitive to the humidity inside the corresponding chamber cells of the enclosed space of the measuring chamber 10. If any pin hole exists on the container, the air or liquid containing the water flows out of the container, and the humidity of the chamber cell corresponding to the pine hole rises. Thus, the corresponding device senses the changes in humidity. The humidity sensitive device may be a device using the hygroscopic properties of a film composed of, for example, lithium chloride (LiC$l$) and polyvinyl alcohol (PVA) formed between two electrodes. The response rate of the humidity sensitive device comprising the film of LiC$l$ and PVA is one minute or two at a low temperature. In order to obtain a faster response rate, a device which uses a change in capacitance caused by the moisture adsorption in a porous aluminum oxide dielectric film may be used. The response rate of this device is of one second or less at a low temperature.

The humidity detecting device is sensitive to the water amount adhered onto the device per se. Therefore, the response rate of these devices is generally slow, which is defined as a time period in which the water to be adhered to the device is balanced to the humidity in the atmosphere. If there is no water from the pin hole, only dehydration occurs due to exhausting from the chamber, so that the water amount on the device is reduced, and the capacitance of the last mentioned device is reduced. Once the chamber is returned to the atmosphere, the water in the air is adhered to the device, so that the water amount on the device is restored. The adsorption rate and the dehydration rate are different depending upon the device per se, but the dehydration rate can be controlled by the exhaust rate. In the embodiment of FIG. 1, the measuring chamber 10, the humidity sensitive devices 31 to 34, the vacuum tank 50 and the vacuum pump 60 are directly connected, so that the water in the measuring chamber 10 is adhered onto the devices 31 to 34. However, the dehydration always occurs in the embodiment shown. The dehydration rate is controlled by valves 41 to 44. Alternatively, electromagnetic valve may be mounted between the vacuum tank 50 and the vacuum pump 60 in order to stop the dehydration at a desired time. Once the vacuum tank 50 is exhausted, it is retained to a uniform pressure, and thereafter, the electromagnetic valve is operated by means of a timer means (not shown), so that the vacuum pump and the vacuum tank are put into a shut-off condition while the measuring chambers and the vacuum tank are connected directly with each other. Thus, the water which leaked from the pin hole can be adhered onto the device effectively. As another alternative method, a plunger may be used instead of using the vacuum pump for providing a vacuum condition. More specifically, the measuring chamber is reduced in pressure by pulling a plunger coupled to communicate therewith. With the plunger, when it is restored to the original position again, the water which leaked from the container does not come outside. This disadvantage means that the excessive reduction thereof in pressure can not be effected. On the other hand, the plunger is less costly, since the expensive vacuum pump is not used.

The humidity sensitive devices 31 and 32 which are related to two chambers, preferably, chambers 11 and 12 located in symmetrical or opposite positions are connected to a succeeding impedance change detector 70. Similarly, two humidity sensitive devices 33 and 34 which are related to two chamber, preferably, chambers 13 and 14 located in symmetrical or opposite positions are connected to another succeeding impedance change detector 70. Each humidity sensitive device gives rise to a change in impedance thereacross according to a change in humidity. An output which has been detected by means of the each impedance change detector 70 is amplified by means of each preamplifier 80. Then, it is compared with an output of a reference voltage source 100 by each comparator circuit 90 for threshold detection, and an output therefrom is displayed by means of a display unit 200. A more detailed electric circuit thereof will be described subsequently with reference to FIG. 7.

Figure 3:
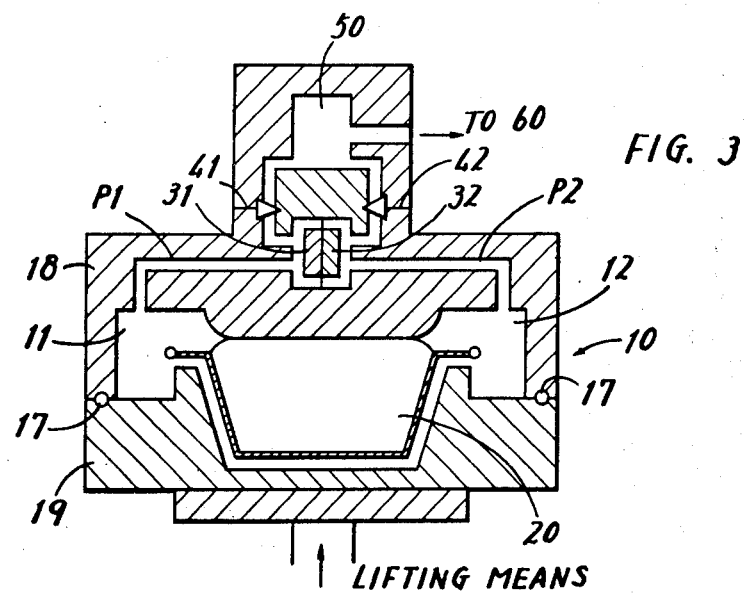
FIG. 3 is a cross-sectional view taken along a line A — A of a measuring chamber 10 of FIG. 1.

FIGS. 3 to 6 illustrate views of several embodiments of the measuring chamber 10 of the present invention. FIG. 3 shows a cross-sectional view taken along a line A — A of the measuring chamber 10 of FIG. 1. Referring to FIG. 3, chamber cells 11 and 12 are mutually airtight to form independent spaces. Although not shown in FIg. 3, the chamber 10 shown therein comprises four sets of partitions, the top surfaces of which each are of such geometry that the partitions are in close contact with the surface of the housed container 20, whereby such independent spaces are formed. The chamber cells 11 and 12 are coupled to pipes P1 and P2, respectively, and are communicated in common to the vacuum tank 50. On the way to the vacuum tank 50, humidity sensitive devices 31 and 32 are provided independently, and furthermore flow adjusting valves 41 and 42 are provided. The measuring chamber 10 is comprised of an upper member 18 and a lower member 19. After the container 20 has been placed in the lower member 19, the member 19 is lifted toward the upper member 18 by means of a lift means, so that the upper member 18 and the lower member 19 are coupled to form the enclosed chamber 10. Preferably, an "0" ring is disposed between the upper member 18 and the lower member 19, thus improving the airtightness of the measuring chamber.

Figure 4A:
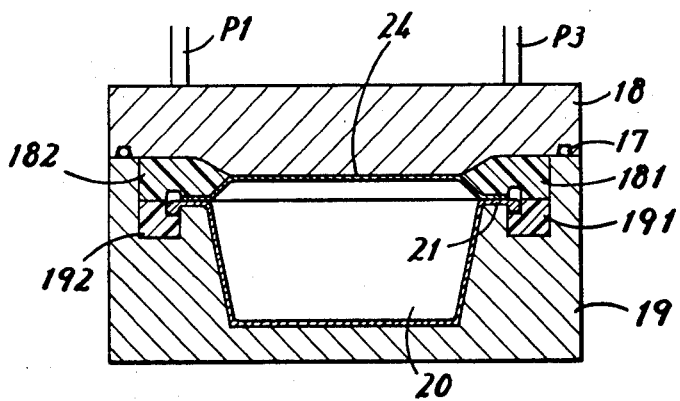
FIG. 4(A) is a cross-sectional view of a measuring chamber of another embodiment.
Figure 4B:
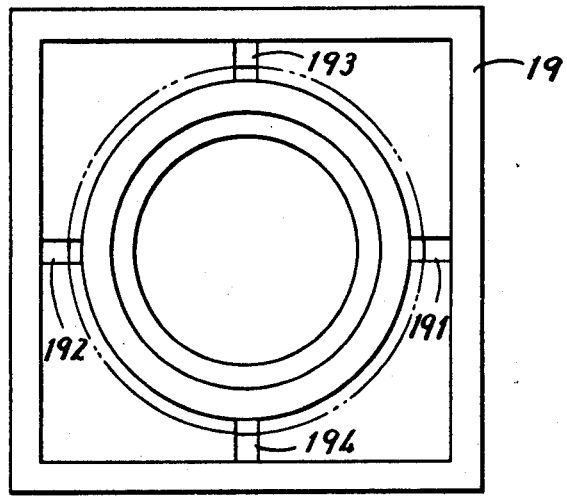
FIG. 4(B) is a top view of a lower member 19 of the measuring chamber, FIG. 5 (a) shows a sectional view of an embodiment of the measuring chamber adapted for a container which is flexible

FIG. 4 shows another embodiment of the measuring chamber. FIG. 4(A) is a sectional view thereof, and FIG. 4(B) is a top view of the lower member 19 of the measuring chamber. The same reference characters in FIG. 4 represent the corresponding portions in FIG. 3. Referring to this embodiment, the whole lower surface of the container 20 is in tight contact with the lower member 19 of the measuring chamber and the lid member 24 is in tight contact with the upper member 18, while a measuring space is formed around the flange portion of the container 20. Since the pressure in the measuring chamber is reduced especially at the time of measurement, the container and the lid member each having some flexibility are swollen somewhat, thus resulting in improved tight contact with the upper member and the lower member all the more. Thus, the substantial space is adapted to be formed between the container and the measuring chamber only around the periphery of the container 20, including the flange portion 21. Accordingly, in this embodiment, the measuring space thus formed is divided into four equal cells. As a result, the pin hole on the sealing portion (heat sealed portion) of the flange is examined preponderantly. More specifically, the upper member 18 is so shaped as to be in close contact with the lid member 24 at an area other than the heat sealed portion and four resilient or rigid partitioning members 181 to 184 (members 183 and 184 are not shown in the figure) are formed at four equally spaced locations of the heat sealed portion of the lid member 24 and the flange portion 21. It is desirable to use particularly the resilient member such as rubber. Four measuring spaces or chamber cells are thus formed by the four resilient or rigid members 181 to 184. The lower member 19 is also formed in a cup shape to be in close contact with the lower surface of the container 20, while resilient or rigid member 191 is provided at the exterior periphery of the flange portion 21 of the lower member 19. Each of the resilient or rigid members 181 to 184 is pressed into contact with the resilient or rigid member 191 when the upper member 18 and the lower member 19 are coupled to each other, and thus the tightness therebetween is increased, resulting in improved airtightness between the adjacent chamber cells.

Figure 5A:
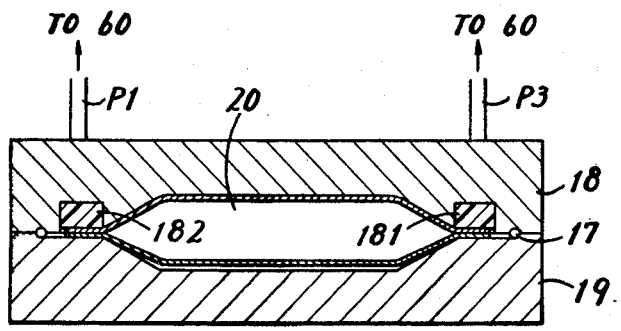
FIG. 5(b) is a bottom view of the upper member 18 and FIG. 5(c) is a top view of the lower member 19 of FIG. 5(A)
Figure 5B:
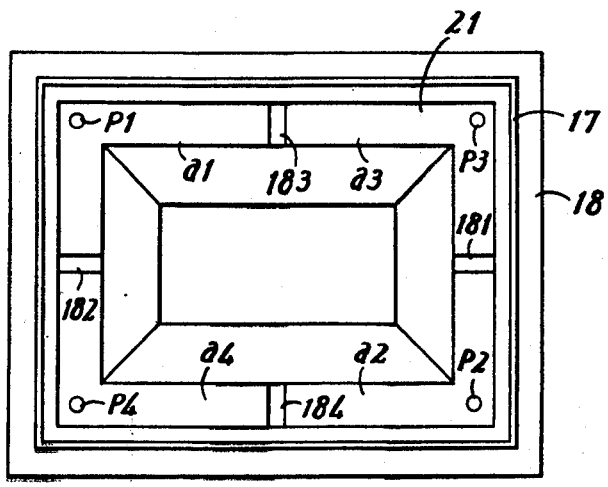
Figure 5C:
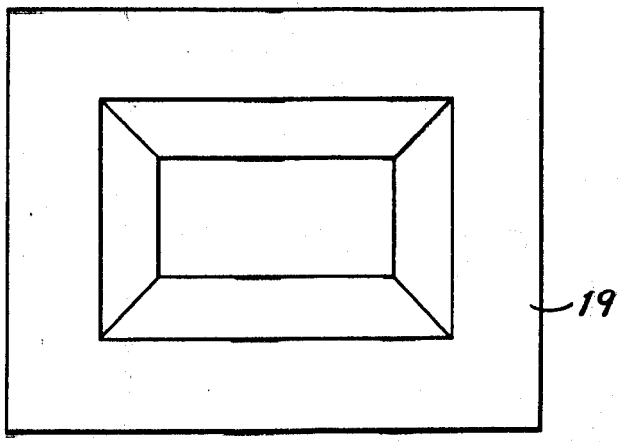

FIG. 5 shows another embodiment of the measuring chamber in case where the container is flexible, such as a pouch. FIG. 5(A) is a sectional view thereof, FIG. 5(B) is a bottom view of the upper member 18 seen from the interior side of the measuring chamber, and FIG. 5(C) is a top view of the lower member 19 seen from the interior side of the measuring chamber. In the same manner as shown in FIG. 4, the upper member 18 and the lower member 19 are formed to be in close contact with the substantial surface of the container 20, and the four resilient or rigid partitioning members 181 to 184 are formed at four spaced locations where the flange portion 21 (heat sealed portion) of the container 20 of the upper member 18 is divided into four, so that four recessed spaces $a1$, $a2$, $a3$ and $a4$ are formed by four resilient or rigid members 181 to 184. Associated pipes P1 to P4 are connected to the recessed spaces $a1$ to $a4$, respectively. The recessed spaces serve as separate chamber cells for detecting a pin hole in the heat sealed portion of the container 20.

Figure 6:
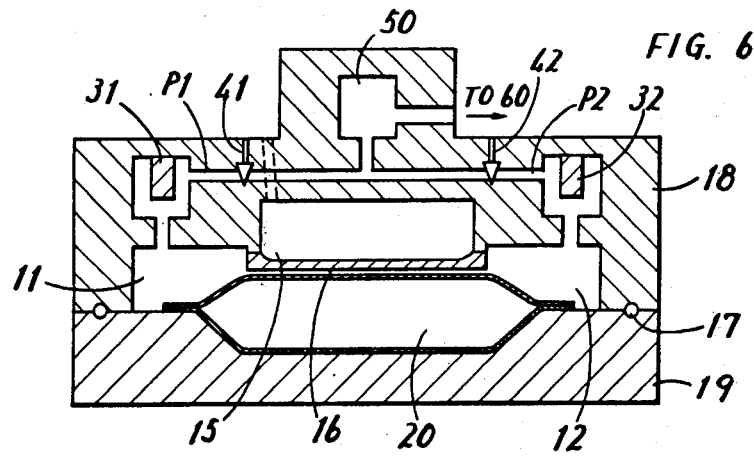
FIG. 6 is a cross-sectional view showing another embodiment of the measuring chamber adapted for a container which is flexible.

FIG. 6 is a sectional view showing still another embodiment which is similar to the FIG. 3 embodiment but is directed to the container which is flexible. Accordingly, the same reference characters are used to represent the corresponding parts in FIG. 3. The chamber cells 11 and 12 are connected from the vacuum tank 50 to the vacuum pump 60. The essential features of the embodiment of FIG. 6 are that the upper member 18 comprises an air chamber 15 communicated with atmosphere and defined by a membrane 16, the lower surface of which separates the chamber cells 11 and 12 together with the partitions, as described previously. Pressure is applied to the container 20 through the membrane 16 by the air pressure exerted in the air chamber 15. Difference in pressures inside and outside of the container 20 may be made greater by supplying the compressed air to the air chamber 15. Alternatively, fluid such as water may be supplied to the air chamber 15. In case of gas such as air, it is possible to apply pressure by heating the air instead of supplying the compressed air. As an alternative approach, pressure can be applied to the container 20 by the use of a mechanical lever, instead of the membrane 16 defining the air chamber 15.

Figure 8:
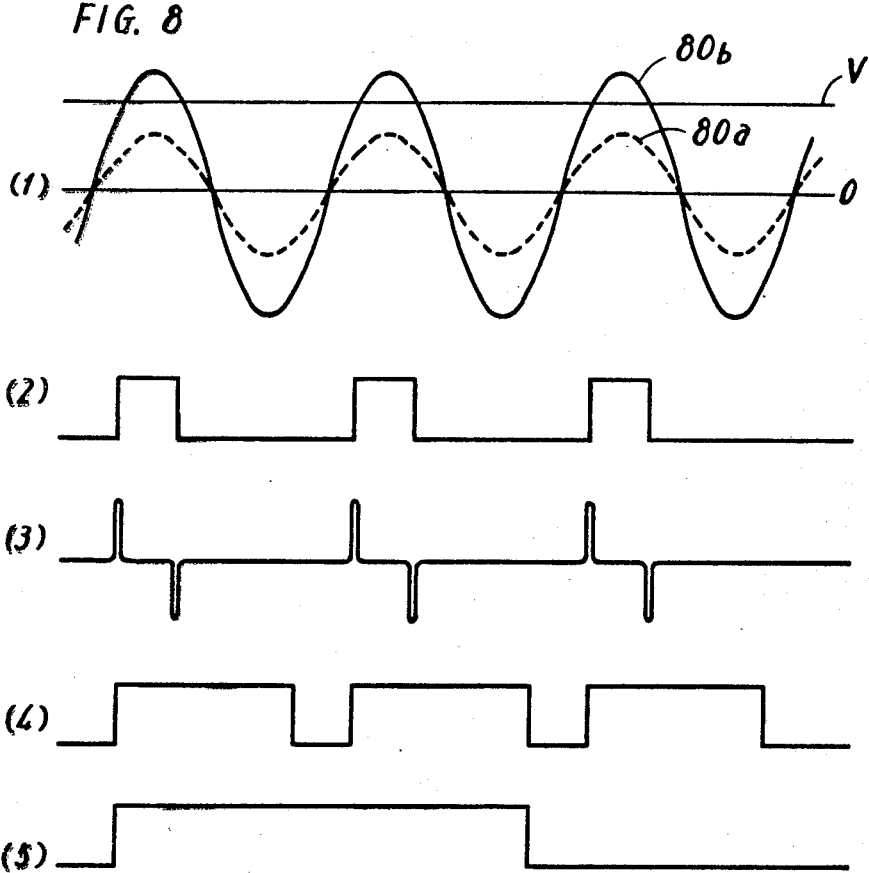
FIG. 8 is a wave form for illustrating the operation of the FIG. 7 embodiment.

FIG. 7 is a detailed block diagram showing an electric connection of the block diagram of FIG. 1. FIG. 8 is a wave form chart for explanation of operation of FIG. 7 diagram. Referring to the embodiment shown, an impedance change detector 70 is constituted by a bridge circuit for the reasons described hereinafter. Two humidity sensitive devices 31 and 32 are connected as two bridge circuit elements of the bridge circuit. Resistors 71 and 72 each having a predetermined resistance value are connected as the other two bridge circuit elements of the bridge circuit. In this embodiment, the humidity sensitive devices 31 and 32 associated with symmetrically positioned chamber cells 11 and 12 are connected as two bridge elements of the bridge circuit to commonly detect the impedance changes. However, in order to individually detect the impedance changes of the humidity sensitive device associated with each chamber cell, a bridge circuit may be provided individually to each of the devices, by connecting only one humidity sensitive device as one bridge element of each of four bridge circuits, so that the defective portion of the container can be detected correctly. An AC power source E is connected to an input of the bridge. The bridge circuit is used as a preferred embodiment of the impedance change detector 70, since only an output corresponding to the difference C1 between the abovedescribed equations (1) and (2) is withdrawn as a detection output if the humidity sensitive devices 31 and 32 sense the humidity of the abovedescribed equations (1) and (2).

The impedance change detection output is amplified by a succeeding preamplifier 80 and is inputted to a comparator circuit 90. The preamplifier 80 is a high input impedance AC amplifier, including a compensating circuit for compensating the errors between the humidity sensing devices. The AC signal applied from the amplifier 80 to the comparator circuit 90 is shown in FIG. 8(1). A reference voltage V as seen in FIG. 8(1) is also supplied to the comparator circuit 90 from a reference voltage generating circuit 100. The AC signal inputted to the comparator circuit 90 is lower than the reference voltage V as shown as 80a, if no defect exists on the container 20. However, the input signal is higher than the reference voltage V as shown as 80b, if any defect exists on the container 20. A display device 200 electrically processes the detection output of the detect to display it. The display device 200 will be described hereinafter in detail. The output of the comparator circuit 90 is wave shaped by a pulse shaping circuit 210 to obtain such an output signal as shown in FIG. 8(2). The signal is differentiated by a differentiation circuit 220 to such a signal as shown in FIG. 8(3). The signal of FIG. 8(3) triggers a single shot multivibrator 240 to obtain the output of FIG. 8(4). The output pulse is integrated by an integration circuit 250 as shown in FIG. 8(5). The integrated output is supplied to a display circuit 260, and the detection of the defect is displayed properly.

In the embodiment shown, the output of the pulse shaping circuit 210 is not applied directly to the display circuit 260, but rather the differentiation circuit 220, the single shot multi-vibrator 240 and the integration circuit 250 are provided therebetween, in order to provide a sufficient display time. In short, after the detection output has been wave shaped into a pulse, it is differentiated once to generate a trigger signal, which triggers the single shot multivibrator, and an output from the single shot multivibrator is integrated in order to provide the sufficient display time. Thus, a high level output is obtained for a predetermined time required for display.

If a plurality of impedance change detectors 70 are employed, all that is necessary is to provide an OR circuit between the differentiation circuits 220 and the single shot multivibrator 240.

FIG. 9 is a block diagram of another embodiment of a circuit for detecting a defect on the container. In short, the embodiment shown receives AC inputs obtained through each of the humidity sensitive devices, which are amplified individually and thereafter rectified. The rectified outputs are each compared with a DC level which serves as a reference. More detailed description will be given hereinafter. For example, AC input obtained through the device 31 is amplified to a sufficient magnitude by a preamplifier AMP1 and furthermore is rectified by a rectification circuit REC1. The output from the rectification circuit REC1 is applied, through a low frequency pass filter F1, to an DC amplifier CA1 having a compensating circuit. The compensating circuit included in the DC amplifier CA1 compensates the errors of the device 31. The output which has been compensated and DC-amplified is supplied to a comparator circuit COM. Similarly, the output which has been obtained through the device 32, a preamplifier AMP2, a rectification circuit REC2, a low frequency pass filter F2 and a DC amplifier CA2 with a compensating circuit is also supplied to the comparator circuit COM. Although the devices 33 and 34 are not shown, the same applies to them. The comparator circuit COM compares a given input with a predetermined fixed level to obtain a comparison output. The comparison output is supplied to a display circuit 260 and the same operation as described in FIG. 7 is effected. In case of an increased number of divided chamber cells of the measuring chamber, a multiplexor can be advantageously used for processing of the output signals.

Figure 11:
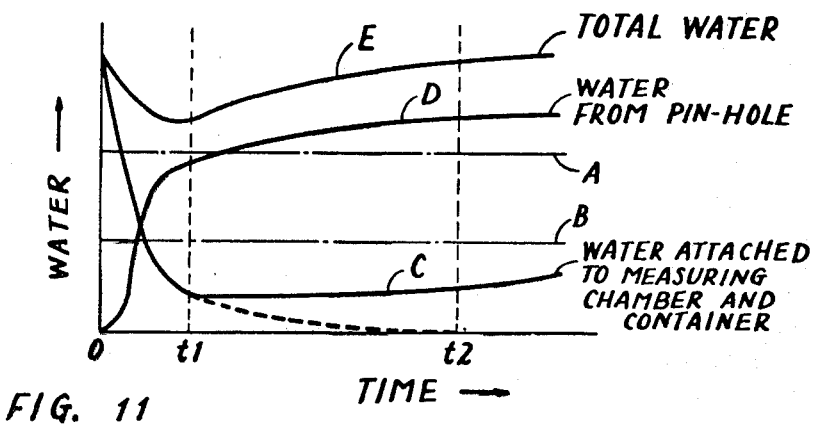
FIG. 11 is a graph showing the relationship between water amount and time in the measuring chamber in connection with the illustration of FIG. 10.
Figure 10:
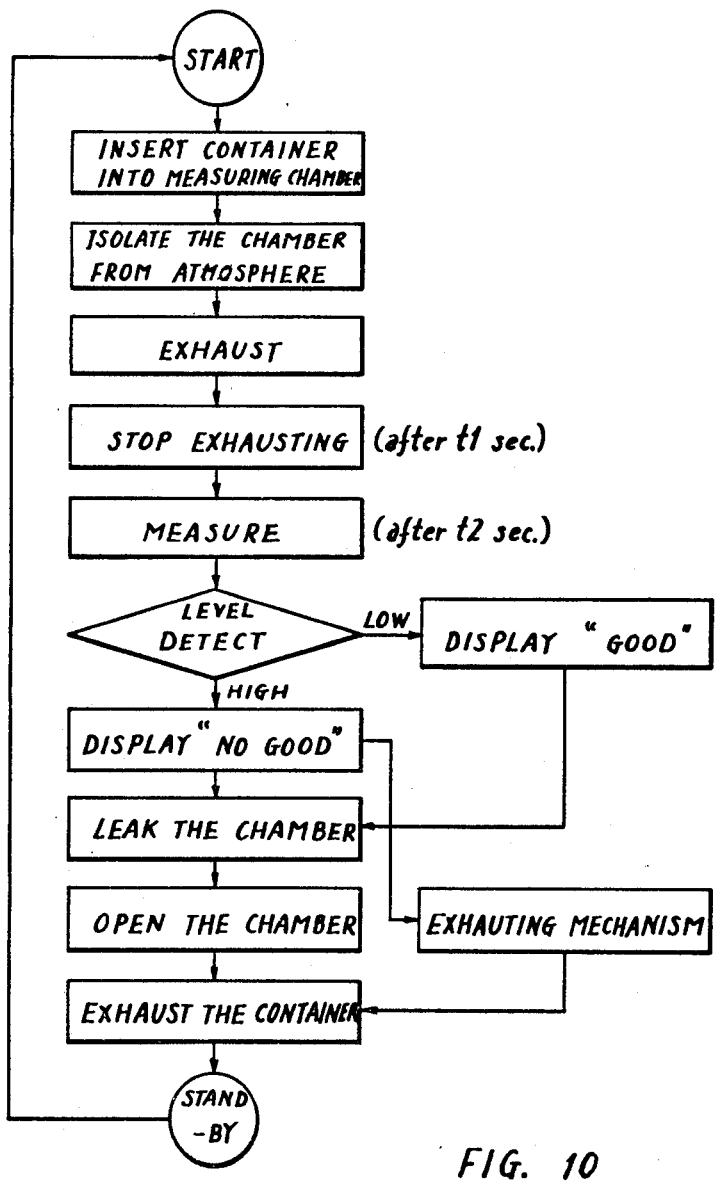
FIG. 10 is a flow chart showing a method for detecting leakage from the container.

The description given hereinabove relates to the apparatus for detecting leakage from a hermetically sealed container. Now, a method of detecting leakage by the use of the detecting apparatus will be described hereinafter. FIG. 10 shows a flow chart for leakage detection. FIG. 11 is a graph showing the relationship between water amount and time in the measuring chamber in connection with the description of FIG. 10. As a precondition for the FIG. 10 process, it is assumed that the apparatus used in the process comprises the measuring chamber 10 divided into the lower member and the upper member, the container being adapted to be inserted therebetween into the chamber. Referring now to FIG. 10, the container to be examined is inserted and received into the prepared measuring chamber. After the container has been received, the upper member and the lower member are coupled to provide a shut-off condition between the measuring chamber and the atmosphere. This shut-off operation can be accomplished, for example, by lifting the lower member by means of a lift means up to the upper member. Once the shut-off condition has been established between the measuring chamber and the atmosphere, the exhaust from the measuring chamber is started. The exhausting is effected by driving the vacuum pump. after the lapse of a fixed time t1 second since the start of the exhaust, the exhausting is stopped. Upon starting of the exhaust, the water adhered to the measuring chamber and the container at an initial stage is removed. If any pin holes exist on the container, the water leakage therefrom increases suddenly. This condition is represented by curves C and D of FIG. 11. As a result, a curve E representing the total water of the measuring chamber is obtained, which is the composition of the curves C and D. As apparent from the graph of FIG. 11, the exhaust time $t1$ second is so chosen as to be a time required for the water (curve C) adhered to the measuring chamber and the container to become below a given level A or B. The reason is that, before such a time, a defect detection output could be obtained, irrespective of existence of a pin hole, if any water adhered originally on the measuring chamber and the container is above a certain level, with the result that the examination is meaningless.

Then, the measurement is started after a given time ($t2 - t1$) second since the exhausting has been stopped. In order to retain the steady state of the water amount of the measuring chamber, a given time is taken after the exhausting has been stopped. The output representative of the water amount inside the measuring chamber is level detected. If it is below a predetermined threshold level, the word "GOOD" is display in a display device, and if it is above the threshold level, the word "NO GOOD" is displayed. After the display has been given, the airtight condition of a vacuum or a low pressure condition inside the measuring chamber is released to open the measuring chamber, and the examined container is discharged. The container is then transferred to undergo a further process, such as packing, etc., if the examination result of the container is "GOOD". A discharging mechanism is also actuated in response to the display "NO GOOD", if the examination result thereof is "NO GOOD", and the container is rejected from a further process. After the container is discharged from the measuring chamber through the discharging mechanism, the above-described steps for the subsequent container are repeated.

In order to reduce influences due to the water attached to the container 20, the container 20 may preferably be dried in advance to remove the water or may be controlled into a fixed amount of water. For the purpose of this preliminary drying, the water of the examined body may be controlled in an oven in which hot wind is circulated at a fixed temperature. Alternatively, the container may be left as it is in dry atmosphere, or it may be left as it is in vacuum, or it may be dried naturally.

In the description of the embodiments given above, the measuring chamber 10 has been divided into an equal volume of cells for convenience' sake, but it is not always divided equally. However, preferably the measuring chamber 10 is divided equally.

According to an aspect of the present invention, the measuring chamber 10 is divided into a plurality of cells and the electrical detection circuits of FIG. 7, for example, are provided in accordance with the number of division thereof, so that a location of the defective portion of the container can be detected accurately and quickly, and can be displayed. The present invention can be applied even to flexible containers, no matter whether or not the container is transparent, resulting in various and great advantages.

Although the embodiment of the apparatus for detecting leakage from container and method therefor in accordance with the present invention has been described in detail, it is understood that modifications and variations of the present invention are possible without departing from the true spirit and the scope of the invention.

What is claimed is:
1. An apparatus for detecting leakage from a container which is filled with water-contained materials and hermetically sealed, comprising
   means for enclosing said container for forming an enclosed space defined by said enclosing means and said container,
   means for partitioning said enclosed space for forming a plurality of enclosed space cells,
   means for causing a difference in pressure between the inside of said container and the inside of said enclosed space, whereby leakage of water molecules is caused through a defective portion of said container,
   a plurality of means each being individually associated with said enclosed space cells for providing an electrical signal associated with the humidity inside of each of said enclosed space cells, and
   means responsive to said electrical signal for providing a signal representative of said leakage of water molecules through said defective portion of said container.
2. An apparatus in accordance with claim 1, in which said container comprises a sealed portion adhered to each other for hermetical seal.
3. An apparatus in accordance with claim 2, in which said container comprises two sheet members adhered to each other at the peripheral portion thereof for housing said water-contained materials.
4. An apparatus in accordance with claim 2, in which said sealed portion comprises a flange-shaped portion.
5. An apparatus in accordance with claim 2, in which said enclosed space is formed along and in the vicinity of said sealed portion, while the other portion of said container is in close contact with said enclosing means.
6. An apparatus in accordance with claim 4, in which said enclosed space is formed along and in the vicinity of said flange-shaped portion, and said partitioning means is adapted to be in close contact with said flange-shaped portion, while the other portion of said container is in close contact with said enclosing means.
7. An apparatus in accordance with claim 6, in which said container comprises two sheet members adhered to each other at the peripheral portion thereof, one of said two sheet members comprising a vessel having a flanged portion formed at the periphery thereof, the other of said two sheet members comprising a lid having a periphery portion adhered to said flanged portion of said vessel, said adhered portion forming said flanged-shaped portion of said peripheral adhered portion.
8. An apparatus in accordance with claim 4, in which said enclosing means comprises two enclosing members, and which further comprises means for driving at least one of said enclosing member for selectively opening or closing said enclosing means.
9. An apparatus in accordance with claim 8, in which one of said enclosing members comprises a wall configuration to be in close contact with an outer surface of said vessel and said flanged portion thereof, the other of said enclosing member comprises a wall configuration to be in close contact with a substantial outer surface of said lid and to form said enclosed space in the vicinity of said sealed portion, and said partitioning means is adapted to press said sealed portion onto said one of said enclosing members.

10. An apparatus in accordance with claim 1, in which said enclosing means comprises two enclosing members, and which further comprises means for driving at least one of said enclosing members for selectively opening or closing said enclosing means.

11. An apparatus in accordance with claim 1, in which said container is flexible, and said pressure difference causing means comprises means for applying pressure to said flexible container.

12. An apparatus in accordance with claim 11, in which said pressure difference causing means further comprises means for reducing pressure inside of said enclosing means.

13. An apparatus in accordance with claim 11, in which said pressure applying means comprises a diaphragm in contact with said flexible container and for defining an enclosed space, and which further comprises means for controlling pressure inside of said enclosed space defined by said diaphragm for controlling pressure applied to said container.

14. An apparatus in accordance with claim 1, in which said pressure difference causing means comprises means for reducing pressure inside of said enclosing means.

15. An apparatus in accordance with claim 14, in which said pressure reducing means comprises a vacuum tank connected to said enclosed space cells and a vacuum pump connected to said vacuum tank for bringing said vacuum tank into a pressure reduced condition.

16. An apparatus in accordance with claim 14, which further comprises valve means provided between said enclosing means and said pressure reducing means for controlling a flow of gas therebetween.

17. An apparatus in accordance with claim 16, which further comprises means responsive to said leakage representing signal for controlling said valve means.

18. An apparatus in accordance with claim 1, in which said means for providing an electrical signal representative of humidity comprises a humidity sensitive device.

19. An apparatus in accordance with claim 18, in which said humidity sensitive device comprises
a pair of electrodes, and
a bulk material formed between said electrodes and having a characteristic of changing the electrical impedance thereacross in response to water molecules adhered thereto.

20. An apparatus in accordance with claim 18, in which said humidity sensitive device comprises
a pair of electrodes, and
a bulk material formed between said electrodes and having a characteristic of changing electrical capacitance thereacross in response to water molecules adsorbed thereto.

21. An apparatus in accordance with claim 20, in which said bulk material of said humidity sensitive device comprises a porous film of aluminum oxide.

22. An apparatus in accordance with claim 18, in which said means for providing an electrical signal representative of humidity further comprises a bridge circuit, said bridge circuit comprising said humidity sensitive device as a bridge circuit element.

23. An apparatus in accordance with claim 1, in which said leakage representing signal providing means comprises means for threshold detecting said humidity associated signal at a predetermined threshold level.

24. An apparatus in accordance with claim 23, in which said leakage representing signal providing means further comprises means for setting said predetermined threshold level.

25. An apparatus in accordance with claim 1, which further comprises means responsive to said leakage representing signal for displaying thereof.

26. An apparatus in accordance with claim 1, in which said partitioning means is of a resilient material.

* * * * *